June 8, 1937. C. W. GINTER 2,083,259
LUBRICANT SERVICING APPARATUS
Filed Oct. 1, 1935
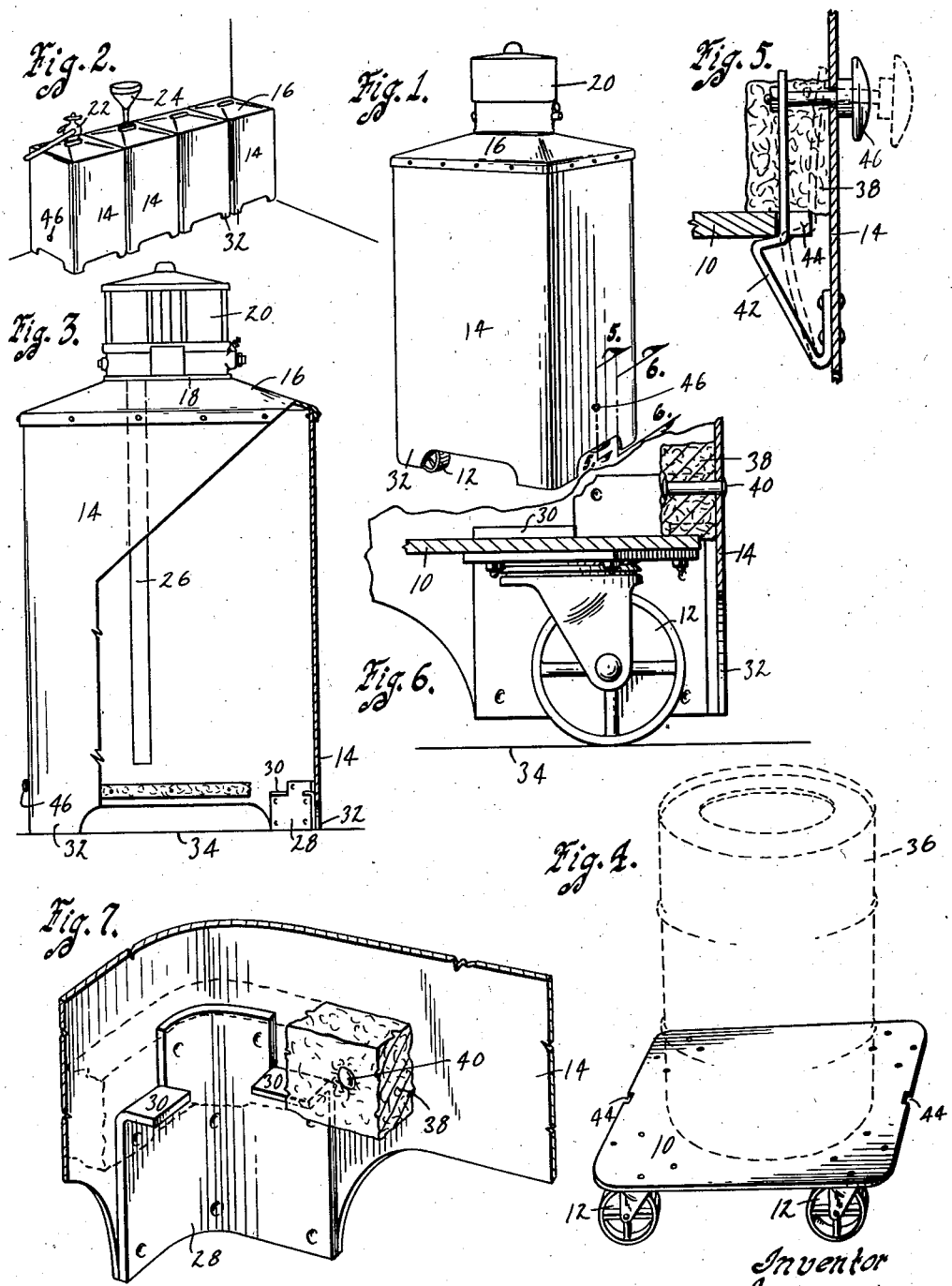
Inventor
Charles W. Ginter
by Bair, Freeman & Sinclair
Attorneys
Witness
H. S. Mumpenmaier Patented June 8, 1937

2,083,259

UNITED STATES PATENT OFFICE 2,083,259

LUBRICANT SERVICING APPARATUS

Charles W. Ginter, Bryan, Ohio, assignor to The Aro Equipment Corporation, Bryan, Ohio, a corporation of Ohio Application October 1, 1935, Serial No. 43,053

13 Claims. (Cl. 221—85)

An object of my invention is to provide an apparatus for lubricant servicing of different types, the apparatus being comparatively simple and inexpensive from a manufacturing standpoint.

A further object is to provide a lubricant servicing apparatus including cabinet type units which provide an excellent opportunity for making the service man's lubrication department neat and attractive in appearance, thus giving his customers and prospective customers a most favorable impression of his ability to efficiently render lubrication service.

A further object is to provide a portable cabinet structure adaptable for various lubricant servicing operations depending on the particular lubricant handling apparatus supported on the cabinet on the casing of the device. Such apparatus, for instance, may include high and low pressure operated lubricators for either portable or stationary use, gear lubricant dispensers, fillers for power guns and portable waste oil drains.

A further object is to provide a lubricant servicing apparatus comprising a dolly unit adaptable for transporting lubricant drums from one position to another, combined with a cover unit for the lubricant drum, which unit includes lubricant handling apparatus, the cover being in the form of a cabinet to enclose both the lubricant drum and the platform and being readily removable therefrom or replaceable thereon, the cabinet serving, when in removed position, as a support for the lubricant handling apparatus and especially providing means to support the lubricant covered intake end of an intake pipe for the lubricant handling apparatus when it is provided with such, in a position out of contact with a floor or like supporting surface, to prevent any possibility of dirt getting into the intake pipe. This feature of the invention effectively solves the problem of what to do with the lubricant handling apparatus when one drum of grease is emptied and another filled one is to be substituted for the empty one.

A further object is to provide sealing means in connection with the casing and platform to prevent upward entrance of dust or the like between the periphery of the platform and the inner wall of the casing and subsequent settling of such dust into the lubricant in the lubricant container, which obviously is undesirable.

A still further object is to provide quickly actuable locking means which automatically moves to locked position when the casing is deposited on the platform, and which can be readily unlocked by depressing a pair of buttons when it is desirable to remove the casing from the platform.

A further object is to provide the platform with castered wheels to facilitate portability of the lubricant servicing apparatus, and also movement and steering of the platform when using it as a dolly for transporting an empty drum to a storage place, and transporting a filled drum from another storage space to the casing which was removed from the empty drum.

A further object is to provide the casing with an overhanging skirt or the like which guards the casters against damaging contact with objects on the floor, and partially conceals them to further enhance the ornamental appearance and neatness of the apparatus.

With these and other objects in view my invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of a lubricant servicing apparatus embodying my invention, the lubricant handling mechanism on the top of the casing being shown in dotted lines.

Figure 2 is a perspective view of a plurality of servicing devices showing how they can be neatly arranged side by side along the wall of a service station or the like, and how but a minimum of space is required (due to the rectangular shape of the devices) for the arrangement.

Figure 3 is a side elevation partly in section of the casing or cabinet showing a combined high and low pressure pumping apparatus mounted thereon, the casing being illustrated as resting on a floor or surface.

Figure 4 is a perspective view of a wheeled platform with the casing removed, showing it used as a dolly for transporting a drum of lubricant (shown in dotted lines) from one location to another.

Figure 5 is an enlarged sectional view on the line 5—5 of Figure 1, showing the latch or locking structure.

Figure 6 is an enlarged sectional view on the line 6—6 of Figure 1, showing the co-operation of the casing with the corner of the platform and of a sealing means with the edge of the platform.

Figure 7 is an inside perspective view of one of the lower corners of the casing showing a reinforcing and supporting element for the corner, and a sealing strip carried by the casing, together with the relation of the sealing strip to the reinforcing element.

In the accompanying drawing I have used the reference numeral 10 to indicate a platform. It is substantially rectangular in outline and is provided at each corner with a caster wheel 12.

I provide a casing 14 preferably formed of sheet metal and of such size that it loosely encloses the platform 10. The casing 14 is provided with a lid 16 terminating in a top plate 18 on which lubricant pumping apparatus 20 may be mounted and will thereby be a unitary structure with the casing 14.

Any type of lubricant handling apparatus can be mounted on the platform 18, such as grease gun filling pumps 22, oil drain funnels 24, and the like, shown by dotted lines in Figure 2 by way of illustration. When a pumping mechanism is mounted on the casing 14 it of course includes an intake pipe 26 which depends from the plate 18, as illustrated in Figure 3.

Inside of each corner of the casing 14 I provide an angle shaped reinforcing element 28 spot welded or otherwise secured to the casing. The element 28 has supporting ears 30 adapted for contact with the corners of the platform 10, as shown in Figure 6 when the casing is mounted on the platform.

The lower edge of each element 28, and likewise a section 32 of each corner of the casing 14, depends below the platform and terminates adjacent a floor or the like supporting surface 34, as shown in Figure 6. The reinforcing elements 28 of the casing 14 provide guards for the caster wheels 12 and partially conceal them.

The intake end of the pipe 26, it will be noted, terminates at a position slightly above the platform 10 to be adjacent the bottom of a grease drum or other lubricant container 36, shown in Figure 4. The projections 32 space the intake end of the pipe 26 substantially above the floor surface 34, as shown in Figure 3, however, when the casing 14 is removed from the platform and deposited on the floor.

There is necessarily a slight space between the edge of the platform 10 and the inner wall of the casing 14, as shown in Figures 5 and 6, so that the casing can be readily positioned over the platform. I provide a means for sealing this space comprising a strip of felt or like sealing material 38 secured as by rivets 40 to the inner wall of the casing 14 adjacent the platform 10. When the casing is placed on the platform, this felt (the lower surface of which is normally slightly below the lower surfaces of the supporting lugs 30 as shown by dotted lines in Figure 7) is forced tightly into contact with the upper surface of the platform by the weight of the casing, thus effectively sealing against entrance of dust to within the casing, which dust would settle in the contents of the drum 36 and eventually be pumped out with the lubricant into the bearings, to their detriment.

I have provided a lubricant servicing apparatus which is neat in appearance when assembled as in Figure 1, and which effectively supports the lubricating apparatus 20 when the casing 14 is removed from an empty drum of grease. Thereupon the wheeled platform 10 can be used as a dolly for transporting the empty drum of grease away from the casing, picking up a filled drum and transporting it to the casing, all of this involving the lifting of the filled drum but a few inches from the floor.

After the casing 14 is returned to the platform 10, the apparatus is in condition for servicing automobiles and the like, and can be transported from a corner of a service station to the place where the automobile is positioned while being serviced, the apparatus being easily transported due to the wheeled dolly, which encourages the operator to return it to its position when he is through with it, and he is thus enabled to keep his service station from becoming "cluttered".

In Figure 5 I show a locking means which may be used in connection with my apparatus which comprises a spring catch 42, two of which are provided, and which are engageable in notches 44 of the platform 10. These automatically move from the dotted position to the full line position when forcing the casing 14 down on the platform 10, and may be returned to the dotted position for removal of the casing by pulling out on knobs 46, which are attached to the latches.

Thereupon the casing can be lifted from the platform, although when the knobs are in full line position, there is no danger of the casing being tipped off of the platform. The platform and the drum of lubricant thereon thus serve as an anchoring means to prevent such tipping of the casing 14, and its attached lubricant handling apparatus, which are comparatively light.

Although I have shown and described my apparatus as being for the purpose of lubricant servicing, it is obvious that it can also be applied to other types of servicing, such as for alcohol, kerosene and the like, and it is to be understood that when I refer to lubricant servicing in my claims, they are not to be limited to servicing apparatus for lubricant only, but for servicing all equivalent substances.

Changes may be made in the construction and arrangement of the various parts of my lubricant servicing apparatus without departing from the real spirit and purpose of my invention, and it is my intention to cover by my claims, any modified forms of structure or use of mechanical equivalents, which may be reasonably included within their scope.

I claim as my invention:

1. In a lubricant servicing apparatus, a wheeled platform for portably supporting a lubricant container, an open bottom casing supported on said platform, and lubricant handling apparatus mounted on the top of said casing for pumping lubricant from said lubricant container, said apparatus having an intake extending into the container, said casing having leg-like extensions terminating adjacent a floor or like supporting surface supporting said wheeled platform.

2. In a lubricant servicing apparatus, a platform for portably supporting a lubricant container, an open bottom casing supported on said platform, wheels on said platform within the outline of said casing and lubricant pumping apparatus mounted on the top of said casing, said pumping apparatus having an intake pipe, said casing having leg-like extensions terminating adjacent a floor or like supporting surface supporting said wheeled platform, the lower end of said intake pipe being substantially spaced from said surface by said leg-like extensions when said casing is removed from said platform and deposited on said floor.

3. In a lubricant servicing apparatus, a platform for portably supporting a lubricant container, wheels adjacent the periphery of said platform for supporting it relative to a floor or like supporting surface, an open bottom casing supported on said platform and readily removable therefrom and lubricant pumping apparatus mounted on the top of said casing, said pumping apparatus having an intake pipe, said casing having leg-like extensions projecting below said platform at points adjacent said wheels to provide partial concealing means for said wheels, the lower end of said intake pipe being substantially spaced from said surface by said leg-like extensions when said casing is removed from said platform and deposited on said floor.

4. In a lubricant servicing apparatus, a wheeled platform for portably supporting a lubricant container, an open bottom casing supported on said platform and readily removable therefrom, the top of said casing being for supporting a lubricant handling apparatus, and sealing means carried by said casing and rendered effective by the weight of the casing when in position on said platform and contacting with said platform when said casing is mounted thereon to prevent upward passage of dust and the like between the periphery of the platform and the interior wall of the casing and entrance thereof into said lubricant container.

5. In a lubricant servicing apparatus, a platform for portably supporting a lubricant container, an open bottom casing supported on said platform for ready removal therefrom, wheels for supporting said platform, said wheels being within the outline of said casing and lubricant pumping apparatus mounted on the top of said casing, said pumping apparatus including an intake pipe having its lower end substantially spaced above the lower end of said casing, and thereby substantially spaced from a floor or like supporting surface when said casing is removed from said platform and deposited on said surface.

6. In a device of the class described, a substantially rectangular platform for supporting a substantially round lubricant container, wheels at the corners of said platform and within the outline thereof, a substantially rectangular casing for enclosing said platform and projecting thereabove to cover a lubricant container when supported on said platform, said casing also projecting therebelow to guard said wheels, the upper end of said casing being for supporting a lubricant apparatus, which apparatus is removable as a unit with said casing from said platform.

7. In a device of the class described, a substantially rectangular platform for supporting a lubricant container, supporting wheels adjacent the corners thereof and within the outline thereof, a substantially rectangular casing for supporting a lubricant apparatus, said casing being readily removable relative to said platform and having means at the corners thereof for engagement with the corners of said platform for thereby supporting said casing on said platform with the wall of said casing surrounding said platform.

8. In a device of the class described, a substantially rectangular platform for supporting a lubricant container, supporting wheels adjacent the corners thereof, a substantially rectangular casing for supporting a lubricant apparatus, said casing having means at the corners thereof for engagement with the corners of said platform for thereby supporting said casing on said platform, and sealing means around the periphery of said platform and rendered effective by resting thereon to prevent entrance of dust and the like to within said casing.

9. In a device of the class described, a substantially rectangular platform for supporting a lubricant container, supporting casters adjacent the corners thereof and within the outline thereof, a substantially rectangular casing for supporting a lubricant apparatus, said casing having means at the corners thereof for engagement with the corners of said platform for thereby supporting said casing on said platform with the wall of said casing surrounding said platform, said casing having depending portions at the corners only thereof extending below said platform to guard and partly conceal said casters.

10. In a lubricant servicing apparatus, a wheeled platform adapted to serve as a dolly for a drum of lubricant and as a support therefor when transferring lubricant relative to said drum, and a unit for covering said drum, said unit being supported on said platform and surrounding said drum and platform and having lubricant handling apparatus carried by the upper end thereof.

11. In a lubricant servicing apparatus, a platform for supporting a lubricant container, means for spacing said platform above a floor or like supporting surface, an open bottom casing supported on said platform and lubricant handling apparatus mounted on the top of said casing for pumping lubricant from said lubricant container, said apparatus having an intake pipe extending into the container, said casing having extensions terminating adjacent said floor or like supporting surface when said casing is supported on said platform, the lower end of said intake pipe being substantially spaced from said floor or like supporting surface by said extensions when said casing is removed from said platform and deposited on said floor.

12. In a lubricant servicing apparatus, a platform for supporting a lubricant container, means for spacing said platform above a floor or like supporting surface, an open bottom casing supported on said platform and readily removable therefrom and lubricant pumping apparatus mounted on the top of said casing, said pumping apparatus having an intake pipe, said pumping apparatus, casing and intake pipe being removable as a unit from said platform, said casing extending below said platform and the lower end of said intake pipe terminating above the platform whereby upon removal of said unit from said platform and depositing thereof on a floor or like surface the lower end of said intake pipe will be substantially spaced from said floor.

13. In a lubricant servicing apparatus, a platform for supporting a lubricant container, means for spacing said platform above a floor or like supporting surface, an open bottom casing supported on said platform and readily removable therefrom, the top of said casing being for supporting lubricant handling apparatus and sealing means carried by said casing and rendered effective by the weight of the casing when in position on said platform and contacting with said platform when said casing is mounted thereon to prevent upward passage of dust and the like between the periphery of the platform and the interior wall of the casing and entrance thereof into said lubricant container.

CHARLES W. GINTER.